Figure 1:
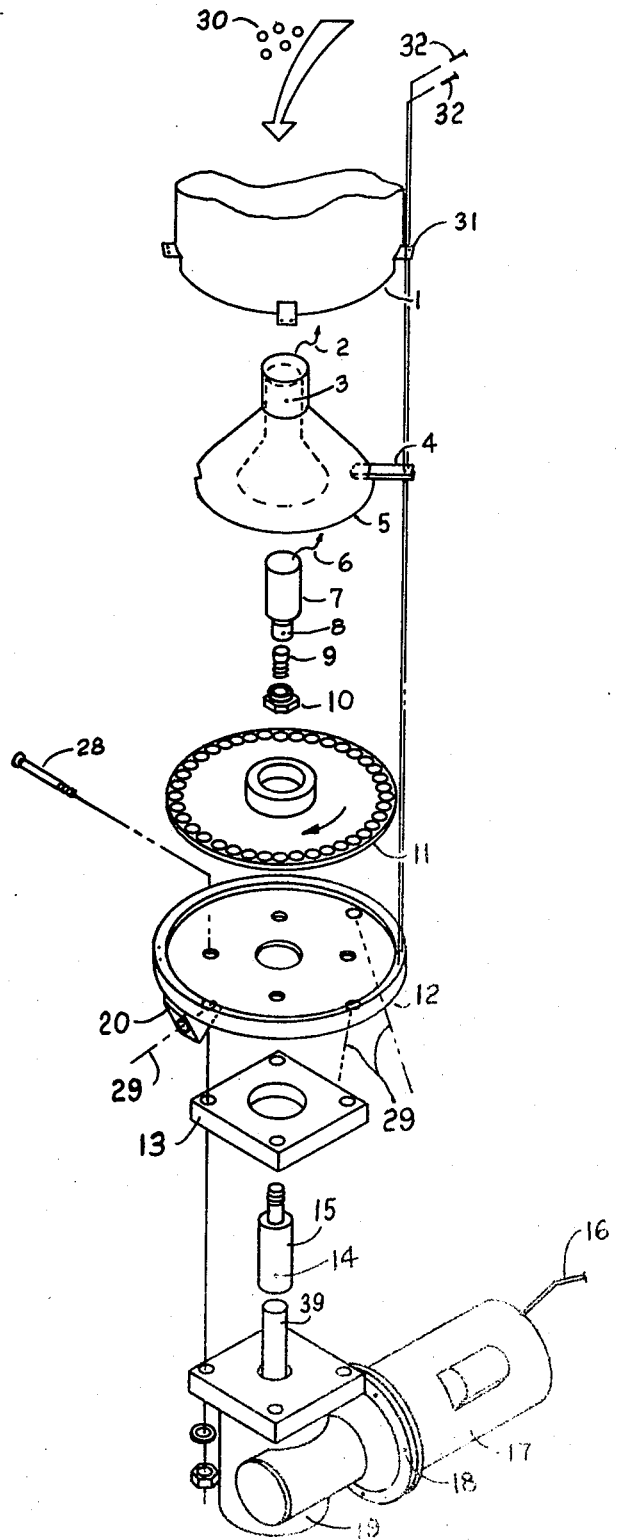

United States Patent [19]
Cutchins et al.

[11] 3,944,137
[45] Mar. 16, 1976

[54] AERIAL SEEDER AND METHOD
[75] Inventors: Malcolm A. Cutchins; Winfred A. Foster, Jr., both of Auburn, Ala.; Peter A. Orlin, Reseda, Calif.; Fred W. Martin; John E. Burkhalter, both of Auburn, Ala.
[73] Assignee: The United States of America as represented by the Secretary of Agriculture, Washington, D.C.
[22] Filed: Feb. 18, 1975
[21] Appl. No.: 550,795

[52] U.S. Cl. ............... 239/11; 239/665; 239/681; 239/171; 221/265; 222/194; 222/330; 222/370
[51] Int. Cl.² ....................................... A01C 17/00
[58] Field of Search ........... 239/11, 66, 69, 97, 650, 239/665, 666, 681, 171, 243; 221/277, 265; 222/194, 330, 370

[56] References Cited
UNITED STATES PATENTS

| | | | |
|---|---|---|---|
| 867,074 | 9/1907 | Pearce | 222/370 X |
| 2,080,897 | 5/1937 | Olivares | 222/330 X |
| 2,314,031 | 3/1943 | Colburn | 222/194 X |
| 2,489,171 | 11/1949 | Balduf | 239/665 |
| 2,865,314 | 12/1958 | Laudin et al. | 222/370 X |
| 2,990,976 | 7/1961 | Fultz | 221/265 |
| 3,476,337 | 11/1969 | Cornett | 239/171 X |
| 3,696,968 | 10/1972 | Jaech | 221/265 |

Primary Examiner—Robert S. Ward, Jr.
Attorney, Agent, or Firm—M. Howard Silverstein; Max D. Hensley

[57] ABSTRACT

A device adapted for operational mounting upon a ground-level superior, moving, and dirigible platform, which device distributes individualized members of a particulate solid according to a ground pattern selectively controllable with respect to distribution frequency and locational placement of the individualized members.

Claimed also is a sequence of operations method for distributing members of a particulate solid according to a ground pattern which ground pattern is selectively controllable with respect to member distribution frequency and locational placement.

3 Claims, 4 Drawing Figures

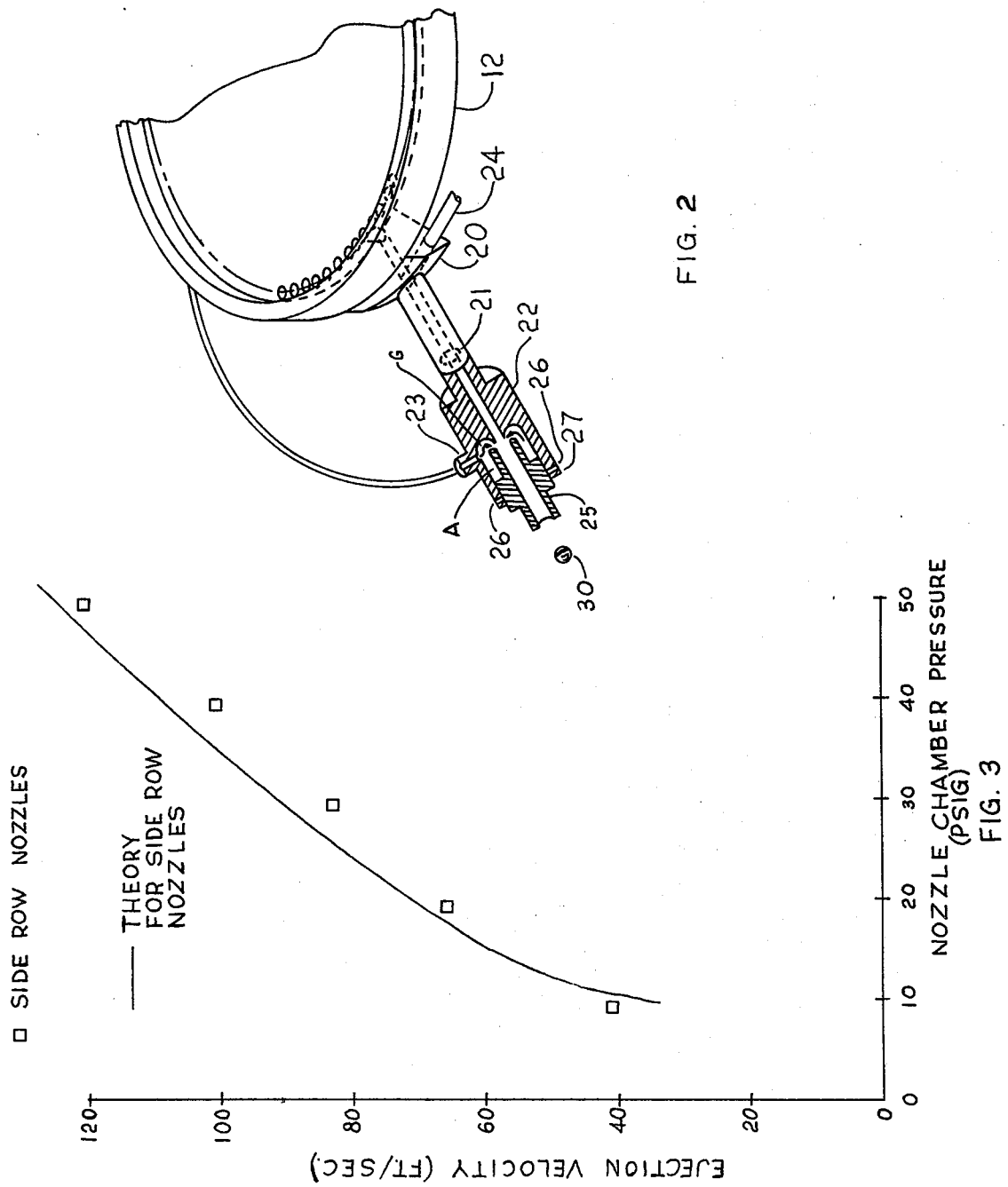

AERIAL SEEDER AND METHOD

A non-exclusive, irrevocable, royalty-free license in the invention herein described, throughout the world for all purposes of the United States Government, with the power to grant sub-licenses for such purposes, is hereby granted to the Government of the United States of America.

Specifically and more narrowly, the instant invention relates to a method and to a device for accomplishing the controlled and uniform distribution of commercially available dewinged and pelletized pine tree seeds over a land area. It will be obvious however that both method and device are applicable for the controlled placement and controlled frequency distribution over a selected and finite area of any uniform, free-flowing particulate solid such as soybean seed, for example.

The continuously performed sequence of operations method involves the steps of segregating the individual members of the particulate solid, ordering the members individualized via the segregation step into spaced, serial arrays and finally projecting, mechanically, the individualized members in ordered arrays at controlled rate and at controlled speed from particle projecting nozzles which nozzles have been directionally aimed to yield selectively oriented particle trajectories. Placement of the individualized members of the particulate solid is thereby accomplished in a pre-planned ground pattern.

The device consists of a receptacle for containing a supply of the uniform, free-flowing particulate solid material, means for segregating and ordering at a controllable rate the individual particle members of the particulate solid and particle projecting means amenable to selective directional orientation and amenable to controllable projection speed for mechanically projecting the segregated and ordered particle members of the particulate solid at a controlled rate, at a controlled speed and in controlled trajectories.

If the operational mounting platform for the claimed device is a fixed wing aircraft or a rotary wing aircraft, the uniform and spaced row seeding of extended areas of quite intractable terrain can be achieved at rates that exceed any conventional controlled placement seeding operation by orders of magnitude. For example, the particular device herein described (a single, three-nozzle unit) can seed at the rate of about 9000 seeds per minute. An experienced person working a long day might possibly plant 2000 pine seedlings. Moreover, the placement of multiple units on an aircraft platform is entirely feasible with consequent savings in flight time and increases in areas seeded.

It is known to seed extensive areas to pine trees in particular and to other crops in general via projection of the seed from ground located machines or from aircraft, as is evident, for example, by the commercial availability of dewinged and pelletized pine tree seed, but such methods and the apparatus associated therewith broadcast the seed in an entirely indiscriminate manner.

The instant claimed method and device accomplish aerial seeding of selected areas at controlled rate together with controlled placement of the individual seeds. Accordingly, the claimed method and device exhibit some compelling inherent advantages over undirected, broadcast seeding by whatever means accomplished.

Directed, uniform seed placement permits of "row seeding" so that in the case of tree farms, pine tree acreage in particular can be ultimately subjected to mechanized harvest methods. Directed, uniform seed placement also allows for the efficient use of high cost hybrid seeds.

The particular device described herein and employed for the purpose of depicting and describing an operating example for the disclosure, is a single unit that utilizes three seed projecting nozzles. This single unit mounted under the centerline of a fixed wing aircraft can sow approximately 9000 dewinged pine tree seeds in pelletized form in one minute (i.e. about 3000 seeds per minute per particle projecting nozzle). The seeds sown are distributed with respect to ground pattern placement in three columns or rows of seeds, each row comprising a four foot wide swath and each swath separated from an adjacent swath by a row spacing 8 feet in width (i.e. one pass of the aircraft with aerial seeder attached and operating seeds an area twenty-eight feet wide).

A considerable and quite obvious advantage of the claimed device vis-a-vis ground level initiated seed placement whether via hand or via machine operations is the far shorter time required to seed commensurate land areas. The time factor advantage is especially important if the planting season is restricted by virtue of weather conditions, for example, or if accelerated planting appears mandatory by reason of forest areas destroyed by fire and susceptible to imminent water and/or wind erosion.

Seeding by the method and the means of the instant invention can be accomplished at times subsequent to periods of inclement weather when land areas to be seeded would present accessibility problems for ground operations.

The following section of the disclosure is submitted as a practical information aid for prospective users of the instant invention.

Certain criteria are of importance for selecting the aircraft to be used as an operational mounting platform for the aerial row seeder. In most instances, the availability of a particular type will be the decisive factor.

Desired spacing of the individual trees along the sown rows is another consideration. Tree spacing along the rows is controlled by the forward speed of the aircraft and by the seed dispensing rate of the seeding device. Percent germination reliability of the seed as sown will also be a factor.

Variation in wind velocity and direction along with inherent air flow fields around various types of aircraft will affect seed placement somewhat. However, these last mentioned effects alter seed placement to a much smaller degree than might be expected. These effects seem to be minimized by the use of high nozzle exit velocities for the individualized seeds being projected coupled with the relatively small size and essentially spherical shape of the pelletized seeds. It is recommended, however, that in the case of rotary winged aircraft, the seed projecting apparatus be placed as far forward on the aircraft as is practical.

Because there is a practical upper limit to the operational rate of the seed dispensing mechanism before jamming occurs, some trade-off must be made between flight speed and tree spacing. The ability of rotary winged aircraft to fly at slower speeds makes the rate of seeding less critical while the lower limit of air-speed for fixed wing aircraft demands a specific seed-dispensing rate for a specific spacing. We estimate the lower limit for fixed wing aircraft seeding operations to be about 70 miles per hour altered somewhat, of course, by aircraft type and pilot skill. Reduced to useful number information, 70 miles per hour is about 103 feet per second. In order to achieve a tree spacing of 1 foot at this speed a seed dispensing rate of 6180 seeds per minute is required; for a tree spacing of 2 feet, 3019 seeds per minute is required. Rotary winged aircraft speeds of 40 miles per hour (58.6 feet per second) require a seed dispensing rate of 3516 seeds per minute for a one tree per foot spacing; 1758 seeds per minute for a spacing of one tree per every two feet.

At this juncture, attention is directed to the drawings and directed, in particular, to the exploded view depicted in FIG. 1 which view will be useful for a detailing both of the structure and of the operation of a particular seeding device. Namely, the device with which the herein disclosed operational data was obtained.

FIG. 1, as noted above, is an exploded view of the apparatus and as such shows all of the components and the positional relationships of the components.

FIG. 2 depicts, via a sectional view, the details of one of several seed projecting nozzles.

FIG. 3 represents graphically the actual seed projection and placement performance of the apparatus side row nozzles (i.e. a port nozzle and a starboard nozzle) relative theoretical performance.

FIG. 4 represents the overall plan view of an actual seeding run performed by the device of the invention operating aboard a fixed wing aircraft. FIG. 4, in addition, shows the seed recovery sampling scheme that was employed for measuring seeding performance.

In the exploded view of FIG. 1, a lower portion fragment of the seed supply storage bin 1 is shown. The bin can be a receptacle of any convenient configuration with the proviso that the lower wall portion (interior) terminate as a circle and with the additional proviso that the interior walls exhibit sufficient vertical inclination to assure gravity induced downward flow of the free-flowing, uniform particulate solid material (seeds) intended for retention within the said bin.

Item 2 is an electric wire lead and associated fitting for a tachometer (the r.p.m. of the motor driven seed segregator or seed metering plate 11 is monitored via a tachometer 7).

Item 3 is a hex screw that functions to fix the location of tachometer 7 relative the inverted cone shaped bin bottom 5.

Item 4, of which one of four is shown, is a support bracket that provides for the locational attachment of the inverted cone-shaped bin bottom 5 to base plate 12.

Seed supply storage bin 1 is also supported positionally and secured to base plate 12. Attachment is via four locating brackets, one of which 31, is shown. Cap screws 32 and 32' secure the bracket 31 to the base plate 12.

Item 6 is the tachometer lead wire to fitting 2 (see above).

Item 7 is the tachometer, the drive portion of which is attached to adapter 9 via hex screw 8.

Item 10 is a threaded nut that serves to clamp the seed segregator plate 11 to segregator plate drive shaft adapter 15.

Item 14 is a hex screw that secures and positions adapter shaft 15 to and relative output shaft 39 of gear reducer component 19. The position (vertical) of adapter shaft 15 controls the rotational clearance (i.e. axial clearance) between rotatable seed segregator plate 11 and stationary base plate 12.

Base plate 12 provides for the support and the locational positioning of the several components of the device.

Item 13 is an adapter plate attached to base plate 12 by four bolts, one of which 28 is shown. Adapter plate 13 joins the gear reducer component 19 to base plate 12.

Gear reducer 19 is actuated by electric motor 17 which is supplied with current through electric wire leads 16 and is attached to the driven end on gear reducer 19 by four bolts, one of which 18 is shown. The drive shaft of gear reducer 19 is attached to and provides rotational drive to seed segregator plate 11 via output shaft 39 and adapter 15. Segregator plate 11 and adapter shaft 15 are joined by threaded nut 10.

Attention is now directed to the three openings that perforate base plate 12 at the locations indicated by lead lines 29. These openings are sized dimensionally to pass individually and serially the seeds intended for use in the device. These openings are so located that they will register precisely and sequentially with each of the seed sized perforations of the seed segregator plate pursuant to rotation of segregator plate 11.

Seed segregator plate 11 is provided in the vicinity of its periphery with a row of perforations uniformly spaced and sized dimensionally to accept and accommodate a single use intended seed. As noted supra, the perforations of the segregator plate are so located that rotation of the segregator plate will bring the several perforations sequentially into register with the associated openings that perforate base plate 12.

Positioned on the underside of base plate 12, at the locations indicated by lead lines 29 are the seed suction and projecting nozzles.

The nozzles of which one of three is shown in FIG. 2, are a composite of component parts 20–27 inclusive. Each nozzle is secured to the underside of base plate 12 via a nozzle angle mounting adapter 20. The junction is sealed with O-ring 21.

Attention is now directed to FIG. 2 which is an isometric view of a nozzle. The nozzle assembly is composed of the following components: nozzle outer housing 22, nozzle inner core 25, nozzle angle mounting adapter 20, locknut 27, gasket 26, and O-ring 21. Standard screws are used to secure housing 22 to adapter 20 with O-ring 21 used to seal the connecting surfaces between the two.

Outer nozzle housing 22 and nozzle core 25 have matching threads along their common cylindrical surfaces. When nozzle core 25 is assembled with nozzle housing 22, they jointly form an annular shaped air chamber (A) and a close tolerance air exit gap (G). The dimension of the gap depends upon the threaded adjustment of core 25 into housing 22. Locknut 27 and gasket 26 insure the dimensional stability of the gap once the gap is established.

The configuration of core 25 and housing 22 at the gap (G) are such that a high velocity annular air jet is formed as the air exits the annular air chamber through the gap.

The high velocity air jet entrains air from upstream the gap and as a consequence creates the suction that draws each seed in turn from its position in the seed segregator plate down through the opening in the base plate, through the angle mounting adapter and into the nozzle where, once downstream, past the air gap, the driving force of the air relative the seed changes from suction to pressure which pressure entity propels the seed from the seed egress aperture of the nozzle into a trajectory that is subject to control via adjustment of the air pressure supplied to the nozzle through air supply opening 23 and via modification of the nozzle adapter angle which for the device described was set at 60° relative vertical.

A supply of low pressure air (16–30 pounds per square inch) is either available on board the aircraft platform or can be produced by an off-the-shelf compressor item, not part of the claimed invention. The same is true of the lines and the connections used to join the low-pressure air supply to the seed projecting nozzles.

Ejection velocity is controlled via air pressure and can be predicted analytically as is shown in FIG. 3. The rate of seeds dispensed through each seed projecting nozzle is dependent on the speed of rotation of the seed segregator plate. Test results yielded measured rates as shown below for a segregator plate approximately 11 inches in diameter and carrying 90 perforations rotating 50 times per minute with an air supply to the seed projecting nozzles being held at 40 pounds per square inch gauge pressure.

| Nozzle Assembly | Range (Seeds/Minute) | Mean |
|---|---|---|
| Right | 2940–3329 | 3173 |
| Center | 2179–2480 | 2304 |
| Left | 2310–2672 | 2440 |

The seed segregator plate measured 11 inches in diameter and carried 90 openings.

The following will provide a useful guide for adjusting the nozzle air-gap. The air-gap, which provides upstream suction to draw the isolated seeds out of the segregator plate into the nozzle assembly and additionally supplies downstream driving force pressure to eject the seeds from the nozzle egress aperture, should be so adjusted that the gap area (cylindrical area) approximates 1/10 of the nozzle egress aperture area (circular area). Such an adjustment used with 30 to 40 pounds per square inch of air pressure supplied to the nozzle assembly will provide a useful upstream suction of from about 20 to 30 inches of water.

In general, the device of the instant invention operates as follows.

A supply of dewinged and pelletized pine tree seeds, item 30 of FIG. 1, is introduced into the seed supply storage bin 1. Dewinged pine tree seeds coated with a water soluble clay and, if desired, augmented with germination and growth promoting ingredients are commercially available. The coated seeds in pelletized form are approximately 3/16 of an inch in diameter, free-flowing and are very nearly spherical in shape. The pelletized seeds introduced into bin 1 flow via gravity downward toward the bin nadir by reason of the vertical side walls of the bin and by reason of the steeply inclined slope of the inverted cone-shaped bin bottom 5. The bin nadir consists of an annular ring shaped area delimited by the concentric outer edge of the bin bottom and the bin interior side walls. The annular ring shaped nadir area of the bin is occupied by that exposed (i.e. exposed with respect to the interior of the bin) peripheral portion of the seed segregator plate 11 which carries the accurately ordered and spaced seed sized perforations. The free-flowing essentially spherical, dewinged and pelletized seeds within the bin, by virtue of gravity induced downward flow, ultimately reach the perforated portion of seed segregator plate 11. The individual perforations being rather precisely sized relative the individual pelletized seeds, accept and substantially isolate from the seed supply one seed per plate perforation. The individual seeds stay within their respective segregator plate perforations until such time, pursuant of plate rotation, that a segregator plate perforation with a resident seed comes into register with one of the openings in base plate 12 the opening communicates with an associated seed acceleration and projection nozzle lead line 29. At the moment of register between the segregator plate perforation and the base plate opening which defines a seed conduit to the associated seed projection nozzle, the suction effect from the base plate proximal end of the nozzle (i.e. the nozzle portion upstream the nozzle air-gap) draws the individual seed resident within the segregator plate perforation downward out of the segregator plate perforation, through the momentarily indexed opening in the base plate and into the seed projection nozzle. The seed, once past the nozzle air-gap is accelerated via air pressure downstream the nozzle air-gap and is finally projected from the nozzle seed egress aperture into a preplaned trajectory. The trajectory of the projected seed is controlled relative the vertical plane via the nozzle angle adapter and relative the horizontal plane via directional orientation of the nozzle seed egress aperture. Pressure of the air being supplied to the projection nozzle affords control of the seed projection velocity. The rate of seed projection is controlled via the rotating speed of the seed segregator plate. Soon after the instant an individual seed is removed from its resident location within a seed segregator plate perforation, the location, upon exit from beneath bracket 4 is filled by another seed from the seed supply within the bin above the rotating seed segregator plate.

The next immediate section of the disclosure relates to a test of the device and of the method from on board a fixed wing aircraft.

The device was mounted, for purposes of flight testing, on a Cessna 172. The entire assembly was supported beneath the fuselage on the centerline and at an essentially midship location.

Three seed projecting nozzles were employed: one directed 90° to the right, one directed 90° to the left, and one directed center aft, all orientations established with respect to the seeding flight path of the aircraft.

All three seed projection nozzles were set in the vertical plane at an angle of 60° (i.e. the seed egress aperture was aimed at a downward angle of 30° relative horizontal). Air pressure supplied to the seed projection nozzles was controlled at 40 pounds per square inch. Rate of seed distribution was controlled at 9000 seeds per minute (3000 seeds per nozzle per minute). This rate of seeding requires a seed segregator plate rotation of about 50 revolutions per minute with the flight tested model of the device.

Aircraft forward speed was held at 80 miles per hour and altitude maintained within the range 25–35 feet. Directional guidance for the aircraft pilot was in the form of a lime line and a ground located transit was utilized to check deviation of the aircraft from the intended path during the seeding run. Actual deviation from the intended path during the seeding run was less than six inches. Wind velocity during the seeding run was approximately one mile per hour off the portside quarter.

Figure 4:
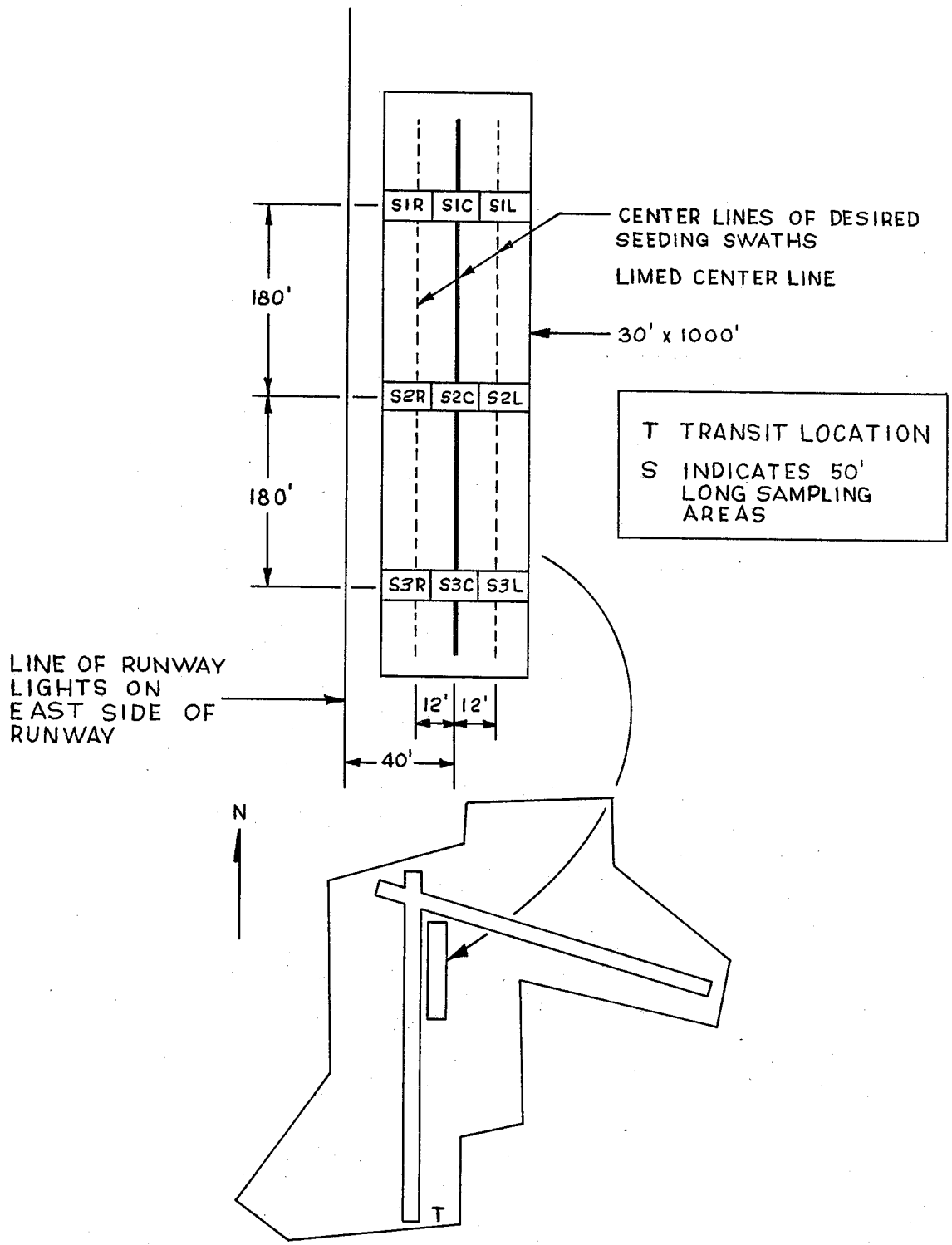

The overall plan of the seeding run is depicted in FIG. 4 which figure is essentially self-explanatory. Attention is however directed to the nine sampling areas (the sampling areas for each of the three seed projecting nozzles). The sampling areas are designated S, $S_2R$, $S_3R$ for the right hand located nozzle; S, C, and so forth, for the center nozzle and S, L, and so forth, for the left hand located nozzle. Projected seeds were located in the designated sampling areas to the end that effectiveness of the aerial seeder could be established.

Analysis of the sampled areas and related computer simulation demonstrated that employing seed projection nozzle air pressures between about 16 and 30 pounds per square inch, cross winds of up to 5 feet per second can be tolerated without seed impact points straying beyond the intended seeding swath of a particular nozzle. Air pressures within this range yield seed ejection velocities within the range of 50 to 80 feet per second. Nozzle angles of 60° relative the vertical yield better seed placement than nozzle angles of 30°. Orientation of the center nozzle aft produces better seed placement than a forward orientation. Forward speed of 80 miles per hour and a seed projection rate of 3000 seeds per minute will produce a spacing of the seeds along the row of approximately 2 feet. The invention having thus been disclosed what we claim is recited infra.

We claim:

1. A device operable from a controlled, ground-level superior, moving and dirigible platform to segregate the particles of a free-flowing, uniform particulate solid material and to disperse the segregated particles over a land area in accordance with a preselected pattern, which device consists of the following integrated components each defined as a means and characterized by a related function:
   a. means defining a receptacle with bottom and side walls adapted to contain and deliver a continuing supply of free-flowing, uniform, particulate solid material to the receptacle bottom via gravity induced downward displacement;
   b. means, numbering at least one, in the form of openings dimensionally sized to pass segregated particles serially, defining interior-exterior communication through the receptacle bottom;
   c. particle segregating means adapted to individualize and serially order in spaced array, the individual particles from a supply of free-flowing, uniform particulate solid material, said means disposed intermediate the material supply and the nadir area of the receptacle bottom, said segregating means in the form of a generally planar member extended in length and width dimensions to conform with at least the nadir area of the receptacle bottom, movement clearance there-between provided, said member provided with an associated driving mechanism controllable to impart to said member uniform periodic movement in a plane normal to the nadir area of the receptacle bottom, said member perforated over the length and width extended area with a multiplicity of spaced, uniform openings directed through the thickness dimension of the member and collectively disposed to define at least one functionally endless, serially ordered array of openings, each opening adapted dimensionally to accommodate, effectively isolate, and transport individual segregated particles from the material supply, the openings severally disposed to insure that periodic movement of the extended member will carry each opening, serially relative its immediate array adjacent openings, into register with a receptacle bottom opening, once per cycle of periodic movement;
   d. particle projecting means, numerically equal to the receptacle bottom openings of (b) supra, each projecting means comprising a particle ingress aperture communicatively adjacent an associated receptacle bottom opening, a particle accelerating section actuated via an externally supplied pressurized fluid, and a particle egress aperture, each projecting means selectively adjustable relative the directional orientation in space of its particle egress aperture and each particle projecting means functionally adapted to serially accept, serially accelerate, and serially project segregated and ordered individual particles away from its egress aperture at controlled interval rate and at controlled speed, thereby to generate in space a trajectory defined by an ordered array of moving, spaced particles, the plurality of particle projecting means, severally aimed pursuant to a planned collective trajectory orientation, continuously translocated via movement of the platform effecting distribution of individualized particles in accordance with a predetermined ground pattern.

2. A device for effecting the uniform, patterned seeding of land areas which device is mounted upon and operated from a controlled, ground level superior, moving, and dirigible platform and which device consists of the following integrated combination of components viz— a seed supply bin, a seed segregator with included motor drive for individualizing and ordering seeds from the seed supply bin, and a plurality of directionally oriented seed accelerating and projecting nozzles activated via low pressure air:

seed supply bin consisting of seed confining side walls and bottom, said side walls shaped in any convenient conformation with the proviso that the interior wall surfaces exhibit a vertical inclination sufficient to assure gravity induced downward travel of the confined supply of seed and with the additional proviso that the supply bin interior wall lower edge terminate in a circular configuration, said supply bin bottom shaped in the form of an inverted cone with the cone surface upward slope toward the apex at least sufficient to assure gravity induced downward travel of the confined seed supply and with the inverted cone lower edge terminating in a circular configuration disposed horizontally adjacent and interiorly concentric to the supply bin interior wall lower edge, thereby to delimit a supply bin nadir in the form of a horizontally disposed, annular ring shaped area which supply bin nadir is integral and intervening the respective lower edges of the supply bin side walls and cone shaped bottom, the horizontal width dimension of the annular ring shaped supply bin nadir approximating but sensibly exceeding the maximum dimension of a use contemplated individual seed, at least a plurality of three selectively and regularly spaced openings through the supply bin nadir providing communication with the supply bin exterior, the openings dimensionally adapted severally to pass singly and serially individualized members of the use contemplated seed supply;

seed segregator consisting of an annular ring shaped member rotatably driven via an associated driving motor and rotatably mounted with biradial and axial clearance within the annular ring shaped space intervening the respective lower edges of the supply bin interior side walls and the inverted cone shaped bottom and vertically coincident the supply bin nadir, said annular ring shaped member of width and thickness dimensions approximating but sensibly exceeding the maximum dimension of a use contemplated individual seed and said annular ring-shaped member perforated along its entire annular course with at least one row of arcuately spaced and vertically directed openings, severally adapted to accommodate and to pass individually, use contemplated seeds and said openings severally adapted and disposed to register, during driven rotation of the seed segregator, with the openings of the supply bin nadir recited supra, operational rotation of the perforated ring-shaped seed segregator at the bottom of the supply bin effecting the acceptance and the withdrawal of individual seeds from the seed supply into the perforations, forming thereby a continuous, ordered and spaced array of seeds, one seed in each perforation and operational rotation of the segregator effecting further, the delivery and discharge of ordered and spaced individual seeds at any instant during segregator rotation when a perforation with a resident seed comes into register with a supply bin nadir opening segregator perforations emptied of a resident seed via downward discharge through the supply bin nadir, concomitantly accept and withdraw a seed replacement from the supply above;

seed accelerating and projecting nozzles equal in number to the openings through the supply bin nadir, severally adapted to pass serially, individualized seeds and severally consisting of a seed ingress aperture disposed communicatively adjacent an associated supply bin nadir opening, a seed egress aperture directionally oriented in space according to a preselected plan and a tubular seed accelerating section located intermediate the recited apertures and defining a conduit there-between, said seed accelerating section dimensionally adapted to pass individualized seeds serially and provided, proximate the egress aperture, with an air-gap discontinuity in the form of a venturi throat directed toward the egress aperture and surrounded by a concentrically enlarged enclosure carrying low pressure air supplied from an external source, airflow into the air-gap and through the throat with attendant air velocity increase providing via the venturi effect, a reduction in air pressure upstream the throat toward the ingress aperture, thereby enhancing the gravity induced flow of individualized seeds downward from the supply bin, through the seed segregator perforations, the, at some instant, registering supply bin nadir openings and the associated seed ingress apertures of the seed accelerating and projecting nozzles to the venturi throat, concurrently, airflow through the throat with attendant air velocity increase providing a driving force downstream the throat toward the egress aperture thereby accelerating the individualized seeds and projecting the accelerated seed away from the egress aperture, individualized and arrayed seeds projected in continuous and moving trajectories from the several directionally oriented nozzles, which nozzles as integral components of the device undergo a constant and systematic translocation via controlled movement of the said platform, collectively effect the uniform seeding of a land area in accordance with a preselected pattern.

3. A method for the uniform, ground patterned seeding of land areas which method consists of the following sequential operations performed continuously:
  1. separating seeds as discrete particles from a source supply of uniform, free-flowing seeds;
  2. ordering the separated seeds into a plurality of arrays severally consisting of individualized, serially disposed and sequentially spaced seeds;
  3. mechanically propelling the seeds of the arrays of (2) supra into the air-space above the land area to be seeded at selectively controlled, uniform interval rates and speeds and in selected, severally singular, directionally oriented trajectories from a controlled, moving, dirigible, and ground level superior platform, the collective space oriented trajectories, translocated systematically and continuously via controlled movement of the said platform, effecting the distribution of individualized seeds over a land area in accordance with a preselected ground pattern.

* * * * *